United States Patent [19]

Ho

[11] 4,225,632

[45] Sep. 30, 1980

[54] FABRICATION OF CAPACITIVE TRANSDUCERS

[75] Inventor: Roland K. Ho, McHenry, Ill.

[73] Assignee: Motorola, Inc., Schaumburg, Ill.

[21] Appl. No.: 850,759

[22] Filed: Nov. 11, 1977

[51] Int. Cl.³ .......................... B05D 1/32; H01G 7/00
[52] U.S. Cl. ..................................... 427/79; 29/25.42; 427/266; 427/282; 427/397.7
[58] Field of Search ................... 427/265, 282, 79, 80, 427/81, 272, 266; 361/283; 101/129; 29/25.42; 148/1 NQ; 118/720

[56] References Cited

U.S. PATENT DOCUMENTS

| | | | |
|---|---|---|---|
| 2,852,416 | 9/1958 | McNary et al. | 118/720 X |
| 3,292,059 | 12/1966 | Woods | 361/283 |
| 3,647,445 | 3/1972 | Burns | 96/36.2 |
| 3,697,835 | 10/1972 | Jatori | 361/283 |
| 3,748,571 | 7/1973 | Kurtz | 361/283 |
| 3,808,480 | 4/1974 | Johnston | 361/283 |
| 3,900,641 | 8/1975 | Woodman | 427/265 |
| 3,950,170 | 4/1976 | Grosholz | 96/27 E |
| 4,066,458 | 1/1978 | Huckert | 96/27 E |

Primary Examiner—Morris Kaplan

Attorney, Agent, or Firm—James W. Gillman; Phillip H. Melamed; Donald J. Lisa

[57] ABSTRACT

A method for constructing a capacitive transducer by depositing a uniform glass insulating ring. The capacitive transducer consists of a circular base substrate and a circular diaphragm, each supporting one of two capacitor electrode and separated by a uniform glass insulating ring which determines a uniform air gap between the capacitor electrodes. Pressure changes cause the diaphragm to flex and thereby produce capacitance changes in relation to the pressure being sensed. The thickness of the glass insulating ring is critical to the production of an accurate pressure transducer and is produced in the following manner. A first glass insulating ring layer is screen printed onto a substrate through a mask having a pattern therein. Subsequently, the relative rotational orientation between the mask pattern and the first screened layer is altered by a predetermined number of degrees and a second screened layer is deposited on top of the first layer. By this technique, a uniformly thick layer of glass frit (finely divided particles) is deposited on the substrate despite any imperfections or variations in the thickness of the mask or the uniformity of the pattern contained in the mask.

10 Claims, 4 Drawing Figures

FABRICATION OF CAPACITIVE TRANSDUCERS

BACKGROUND OF THE INVENTION

The present invention relates generally to the field of depositing uniform layers of materials on a substrate via screen printing techniques, and more particularly to the use of an improved method of depositing a uniform layer of material on a substrate which results in the production of an improved capacitive pressure transducer.

Capacitive pressure transducers are known and generally comprise parallel plate capacitors separated by an air gap wherein the spacing between the parallel plates of the capacitors is altered in response to a sensed pressure. Generally, one electrode plate of the capacitor is deposited on a thick base substrate and the other capacitor electrode is deposited on a thin pressure sensing diaphragm which is spaced away from the base electrode by a ring of insulating glass around the periphery of the diaphragm and base substrate. Typically, the diaphragm, glass ring and base substrate are heated after assembly to form an integral assembly with the capacitor electrodes being spaced apart by a distance totally dependent upon the thickness of the glass layer. A vacuum entrance hole is provided through the base substrate and through this entryway a vacuum is applied to the air cavity bounded by the diaphragm, the glass insulating layer, and the base substrate. By applying varying degrees of vacuum through the vacuum entrance, or by maintaining a constant reference vacuum pressure in the cavity and applying various pressures exterior to the cavity, the transducer diaphragm is flexed and results in changing the capacitance created by the electrodes in response thereto. Thus by monitoring the change in capacitance, the transducer produces an electrical signal related to changes in vacuum pressure. Such transducers are readily adaptable for sensing the vacuum pressures generated by automobile internal combustion engines.

Typically, for mass producing capacitive transducers such as those described above, it is imperative to control the thickness dimension of the glass insulating ring to assure the uniform production of capacitive pressure transducers. Generally, thick film screen printing techniques using either an etched metal mask or a stainless steel such thick film screening techniques, while producing a glass insulating ring at an extremely low cost but have not been able to sufficiently produce a uniformly thick layer of glass insulating material. This is because control over the thickness of a material deposited through a pattern bearing mask primarily depends upon the thickness dimensions of the mask and these dimensions are not sufficiently controllable over the entire pattern to be deposited. In addition, generally thick film screen printing processes have been unable to produce a relatively thick (0.0016 to 0.002 inch) layer of screen printed material. This is because for depositing such a thick layer of material, which is the thickness desired for a capacitive pressure transducer insulating ring, even less control is obtainable as to the uniformity of each layer deposited by the standard thick film screening process. This is because in printing such thick layers of material, either a much thicker layer of emulsion must be used with a stainless steel screen or a much thicker plate material must be used for developing an etched metal mask. In both of these situations, less control over the uniformity of the screen or mask is obtainable and this leads to a less uniform deposit of material on a substrate.

SUMMARY OF THE INVENTION

An object of the present invention is to provide an improved and simplified method for depositing a thick uniform layer of material on a substrate.

A more specific object of the present invention is to provide an improved and simplified method for constructing a capacitive pressure transducer by depositing a uniform layer of material on a substrate.

In one embodiment of the present invention, an improved method for depositing a uniform thick layer of a material on a substrate is provided. This method comprises the steps of; depositing a first layer of a material onto a substrate by using a pattern bearing mask, then altering the relative rotational orientation between the mask pattern and the substrate by a predetermined number of degrees and subsequently depositing a second layer of said material onto said first layer of material by utilizing the same pattern bearing mask, whereby a thick uniform layer of the material is deposited on the substrate despite any imperfections or variations in any of the deposited layers.

According to the present invention, a capacitive pressure transducer is produced by the steps of; depositing a first layer of a material onto a planar substrate surface in a pattern and with a predetermined rotational orientation with respect to the substrate, and subsequently depositing a second layer of said material on said planar substrate surface and on top of said first layer, wherein said second layer has a rotational orientation with respect to said substrate surface which differs from said first layer by a predetermined number of degrees.

Thus the present invention describes the method for producing a uniform layer of material on a substrate through a process of multiple screen printing wherein the rotational orientation between the screen and substrate is altered after each printing to minimize any variations present in the screen printing mask.

BRIEF DESCRIPTION OF THE DRAWINGS

For a more complete understanding of the invention reference should be made to the drawings, in which.

DESCRIPTION OF THE PREFERRED EMBODIMENT

Figure 1:
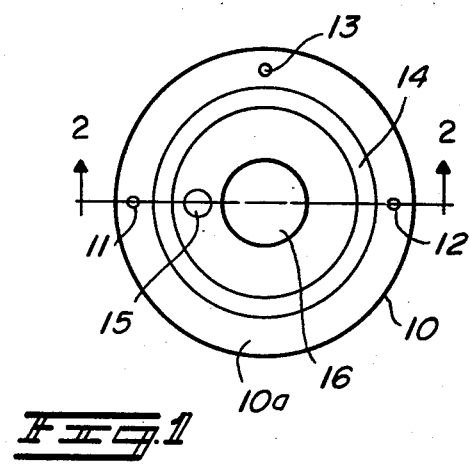
FIG. 1 is a planar view of a capacitive transducer base substrate having a thick annular ring of glass frit particles deposited on it.

Referring to FIG. 1, a thick cylindrical base substrate 10 of a capacitive pressure transducer is illustrated. The base substrate 10 has a thickness T (shown in FIG. 2), a substantially planar circular top surface 10a, as shown in FIG. 1, and locating through holes 11 and 12 along peripheral portions of the circular top surface. In addition, a rotational polarity dimple or through hole 13 is also provided along the peripheral portion of the circular top surface shown in FIG. 1. A thick annular ring of insulating glass material 14 is provided on the top surface of the base substrate 10. The through holes 11 and 12 and the polarity dimple 13 are located outside of the ring 14. A vacuum entryway through hole 15 is provided in the base substrate 10 and is located within the annular glass ring 14. A circular metallic electrode area 16 is also deposited on the top surface of the base substrate 10 and is located within the annular insulating ring 14.

Preferably, the metal electrode 16 and the glass insulating ring 14 are screen printed thick film compositions. In other words, the metallic electrode area 16 initially consisted of a mixture of metallic and glass frit particles along with an organic binder and a vehicle solvent. This mixture is then deposited on the base substrate 10, which is preferably alumina ($Al_2O_3$), by utilizing a mask having a pattern which corresponds to the area on the base substrate 10 which is desired to be metallized. Typically, the patterned mask will comprise a stainless steel screen which has been coated with a photosensitive emulsion and exposed such that the emulsion will not be present in the areas where metallizing is to occur. Subsequently, a squeegee is used to force the desired mixture through the mask and thereby deposit the mixture in a desired pattern onto the base substrate 10. Similarly, the glass insulating ring 14 is contemplated as comprising a mixture of nonconductive glass frit particles combined with an organic binder and solvent. The glass ring 14 is contemplated as being similarly applied to the base substrate 10 by utilizing a mask having a pattern therein.

Figure 2:
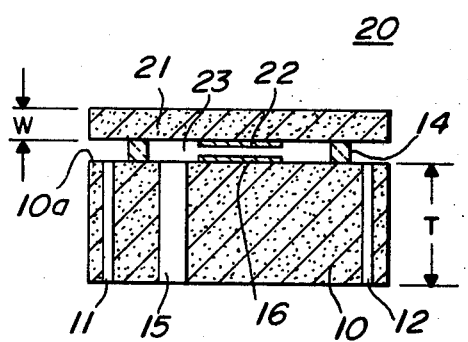
FIG. 2 is a cross sectional view of a capacitive pressure transducer assembly utilizing the substrate shown in FIG. 1.

FIG. 2 illustrates a cross section of a capacitive transducer assembly 20 which utilizes the base substrate 10 shown in FIG. 1. In all Figs. identical reference numbers will be utilized to identify corresponding components. FIG. 2 illustrates that the metallized substrate 10 shown in FIG. 1 has been combined with a relatively thin circular diaphragm plate 21 to essentially form a sandwich structure in which the top surface 10a of the base substrate 10 and the diaphragm 21 are separated by the thickness of the annular ring 14. The diaphragm plate 21 has a circular metallized area 22 that serves as one plate of a capacitor and faces the metallized area 16, the other capacitor plate, across an air gap cavity 23 formed between the top surface 10a of the substrate 10 and the diaphragm 21. From FIG. 2 it is obvious that the thickness of the glass insulating ring 14 will substantially determine the separation between the capacitor plates 22 and 16. As various pressures are applied to the cavity 23 through the vacuum entrance 15, or are applied exterior to the cavity 23 while a reference vacuum is maintained in the cavity, the diaphragm 21, which has a thickness dimension W that is substantially less than the thickness dimension T of the base substrate 10, will flex and alter the distance between the capacitive plates 16 and 22. This change in the spacing of the capacitor plates will result in changing the capacitance created by these two plates. Therefore, by monitoring the capacitance between the plates 16 and 22, an electrical indication of the magnitude of the pressure or vacuum applied to the cavity 23 through the entryway hole 15 can be derived.

It is obvious that controlling the thickness of the insulating annular ring 14 is a prime concern in assuring that identical pressure transducers can be manufactured. As was previously mentioned, standard techniques for controlling the thickness of the glass insulating annular ring 14 have not proved to be satisfactory and therefore the present invention has provided a new technique for insuring a uniform glass insulating layer while still providing the cost economies inherent in the thick film screen printing process.

Figure 3:
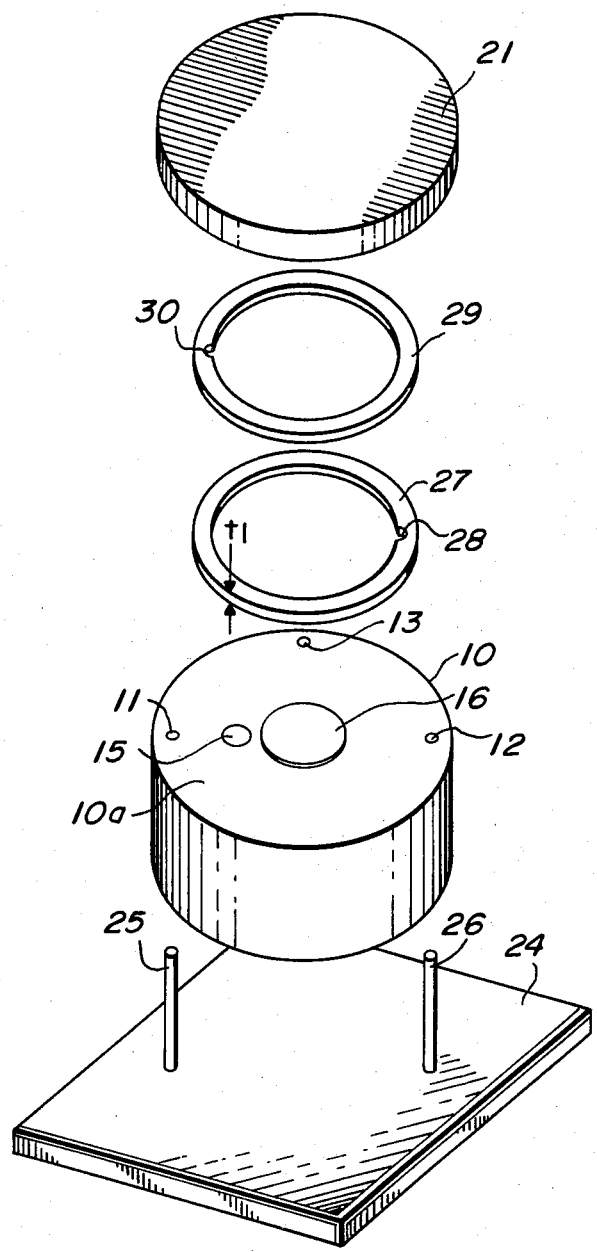
FIG. 3 is an exploded perspective view of the transducer assembly shown in FIG. 2 along with a base substrate positioning plate for locating the base substrate with respect to a printing mask.

FIG. 3 illustrates an exploded view of the pressure transducer shown in FIG. 2. Initially, it is contemplated that the base substrate 10 is to be located in a fixed position on a screen printing platform base 24. The base 24 is illustrated as being rectangular in form and having two locating pins 25 and 26 which are intended to mate with the locating holes 11 and 12 in the base substrate 10. After the base 10 has been mounted on the plate 24, a mask having a pattern corresponding to the angular ring 14 will be positioned over the base substrate 10. Subsequently, a thick film glass frit will be forced through openings in the mask which define the angular ring pattern 14, and this will result in depositing an angular ring first layer 27 of a thick film glass frit material on the top surface 10a of the base substrate 10.

An imperfection 28 is indicated in the first layer 27. The imperfection 28 represents a flaw in the pattern mask which was used to create the first layer 27, and this imperfection will be utilized to demonstrate how the present invention minimizes the effect of such imperfections. The imperfection can consist of either a notch in the annular ring pattern, as shown in FIG. 3, or the imperfection could comprise a thick or thin aberration in the nominal thickness of the first layer 27. The thickness of the first layer 27 in FIG. 3 is designated by the dimension $t_1$.

According to the teachings of the present invention, the base substrate 10 containing the first glass frit layer 27 should then be rotated 180° with respect to the pattern mask that was used to produce the layer 27. By altering the relative rotational orientation between the pattern mask and the screened substrate by a predetermined number of degrees, a subsequent layer of glass frit material can now be screen on top of the first annular ring layer 27 such that the rotational orientation positions of non-uniformities in the screened layers due to mask imperfections will not produce an additive effect but will be averaged out by subsequent screenings. Thus the present invention contemplates utilizing the same mask which produced the first screened layer 27 to now subsequently produce a second screened layer 29 of the same material having the same annular ring pattern but rotated with respect to the first annular ring layer 27 by a predetermined number of rotational degrees. Thus the second layer of glass frit 29 will be deposited in the same annular ring pattern as the first layer 27, and the second layer 29 will be deposited on top of the first layer 27 such that an imperfection 30 in the second layer, corresponding to the imperfection 28 in the first layer, will not be located in the same rotational location as the imperfection 28. This will prevent any additive effect due to multiple screening and will insure a thick uniform deposit of glass frit on the substrate 10.

It is contemplated that the present invention will provide a uniform thick layer of material whenever the relative rotational orientation between the mask pattern and the substrate is altered after each screened layer by an annular rotation equal to 360°/N, where N is equal to the number of layers to be deposited on a substrate base surface. The present invention can be applied to any pattern to be deposited as long as the pattern is substantially rotationally symmetric in multiples of 360°/N.

For the manufacture of capacitive transducers it has been found that having four screenings of glass frit and rotating the substrate 90° with respect to the printing mask after each screening will produce a very uniform annular glass insulating ring of the desired total thickness.

Generally, after each layer of material is screened onto a substrate according to the present invention, the material should then be dried to thereby evaporate all of the solvent in the screened layer. This would aid in preserving the definition of the annular ring pattern. Also, it is contemplated that once the diaphragm plate 21 has been assembled onto a base substrate 10 having an appropriate number of screened glass insulating layers on it, that the entire structure will then be subjected to an extremely high temperature so as to soften the thick film glass frit layers so that they will bind the diaphragm 21 to the base 10 and produce a homogeneous and essentially layerless uniform thick glass frit annular ring.

Figure 4:
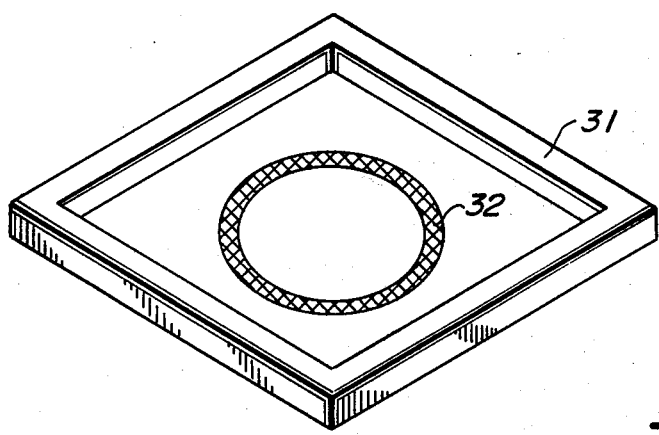
FIG. 4 is a perspective view of a screen printing mask for producing an annular glass insulating ring.

FIG. 4 illustrates a stainless steel screen 31 having an emulsion formed pattern 32 suitable for producing the annular glass frit layers 27 and 29. Similarly, an etched metal mask which comprises a pattern etched directly into a thin plate of metal stock could also be used to produce a suitable pattern.

Thus the essence of the present invention comprises utilizing the same pattern bearing screen and the same material to produce a uniformly thick layer of this material on a substrate by screening several different layers onto the substrate but altering the rotational orientation between the substrate and the screen after depositing each of the layers. This results in producing a uniformly thick layer of material despite any imperfections or variations created in any of the deposited layers by imperfections or variations in the screen being used.

While I have shown and described specific embodiments of this invention, further modifications and improvements will occur to those skilled in the art. All such modifications which retain the basic underlying principles disclosed and claimed herein are within the scope of this invention.

I claim:

1. A method for depositing a uniform screen printed thick layer of material on a substrate, comprising the steps of:
   depositing a first layer of a material onto a substrate by using a pattern bearing mask wherein said pattern is an annular ring and through which said first layer of material passes,
   then altering the relative rotational orientation between the mask pattern and the substrate by a predetermined number of degrees, and
   subsequently depositing a second layer of said material onto said first layer by utilizing said pattern bearing mask, through which said second layer of material passes, whereby a thick uniform layer of said material is deposited on said substrate despite imperfections and variations in any of the deposited layers.

2. A method according to claim 1 wherein said predetermined number of degrees is equal to a multiple of 360°/N, where N equals the total number of layers of said material to be deposited on said substrate by using said pattern mask.

3. A method according to claim 2 wherein said predetermined number of degrees is equal to 90° and said number of layers to be deposited on said substrate by using said mask is four.

4. A method according to claim 1 which includes the step of driving said first layer such that any solvent in said material is substantially evaporated before depositing said second layer.

5. A method according to claim 1 wherein said material comprises glass frit particles.

6. A method according to claim 5 wherein said base substrate comprises a ceramic body having a planar surface on which said layers are to be deposited.

7. A method according to claim 6 wherein said ceramic body and said layers of glass frit are heated to a temperature such that said glass frit softens and becomes bonded to said ceramic substrate.

8. A method according to claim 1 wherein said pattern bearing mask comprises a screen coated with an exposed photosensitive emulsion which defines a pattern corresponding to said layers.

9. A method according to claim 1 wherein said pattern contained in said mask is rotationally symmetric in multiples of a predetermined angle.

10. A method for manufacturing a uniform screen printed glass seal for a capacitive transducer, comprising the steps of:
   depositing a first layer of a material onto a planar substrate surface in a pattern defining the periphery of an inner area of the substrate surface by using a pattern bearing mask wherein said pattern is an annular ring and through which said first layer of material passes, said first layer having a predetermined rotational orientation with respect to said substrate surface,
   then altering the relative rotational orientation between the mask pattern and the substrate by a predetermined number of degrees, and
   subsequently depositing a second layer of said material onto said first layer by utilizing said pattern bearing mask, through which said second layer of material passes, whereby a thick uniform layer of said material is deposited on said substrate despite imperfections and variations in any of the deposited layers.

* * * * *